(12) United States Patent
Scheuermann et al.

(10) Patent No.: US 6,337,360 B1
(45) Date of Patent: Jan. 8, 2002

(54) METHOD OF PRODUCING AQUEOUS DISPERSIONS AS A BASE FOR HOT SEALING ADHESIVES

(75) Inventors: Hubert Scheuermann, Marl; Dieter Tessmer, Darmstadt; Karl Foelsch, Mainz; Wilhelm Elser, Riedlingen; Michael Wicke, Seeheim-Jugenheim, all of (DE)

(73) Assignee: Roehm GmbH Chemische Fabrik, Darmstadt (DE)

( * ) Notice: Subject to any disclaimer, the term of this patent is extended or adjusted under 35 U.S.C. 154(b) by 0 days.

(21) Appl. No.: 09/917,909

(22) Filed: Jul. 31, 2001

Related U.S. Application Data

(62) Division of application No. 09/852,623, filed on May 11, 2001, which is a division of application No. 09/685,594, filed on Oct. 11, 2000, now Pat. No. 6,268,065, which is a division of application No. 09/033,607, filed on Mar. 3, 1998, now Pat. No. 6,194,514.

(30) Foreign Application Priority Data

| Mar. 3, 1997 | (DE) | 197 08 412 |
| Feb. 6, 1998 | (DE) | 198 04 613 |

(51) Int. Cl.$^7$ .................. C23C 28/02; C08F 261/00; C08F 265/06; C09D 137/00; C09D 133/02

(52) U.S. Cl. .................. 523/201; 523/202; 524/458; 524/556; 524/558; 524/561; 525/902; 428/520

(58) Field of Search .................. 523/201, 202; 524/458, 556, 558, 561; 525/902; 428/520

(56) References Cited

U.S. PATENT DOCUMENTS

| 4,948,822 A | * | 8/1990 | Iovine et al. | 523/201 |
| 5,120,889 A | * | 6/1992 | Yamamoto et al. | 524/460 |
| 5,354,810 A | * | 10/1994 | Nagasaki et al. | 525/64 |

* cited by examiner

*Primary Examiner*—Bernard Lipman
*Assistant Examiner*—Kelechi C. Egwim
(74) *Attorney, Agent, or Firm*—Oblon, Spivak, McClelland, Maier & Neustadt, P.C.

(57) ABSTRACT

Poly(meth)acrylate dispersions, comprised of: (A) 50-90 wt. % methacrylic acid esters; (B) 5-30 wt. % acrylic acid alkyl esters; [lit., "acrylic acid acrylic esters"]; (C) 2-10 wt. % of another functionalized monomer; (D) 2-10 wt. % of a radically polymerizable carboxylic acid or a polycarboxylic acid or a partially esterified polycarboxylic acid; and (E) 0-40 wt. % of a monomer which is copolymerizable with components (A) to (D).

13 Claims, No Drawings

METHOD OF PRODUCING AQUEOUS DISPERSIONS AS A BASE FOR HOT SEALING ADHESIVES

This application is a divisional application of U.S. application Ser. No. 09/852,623, filed May 11, 2001, which is a divisional application of U.S. application Ser. No. 09/685,594, filed Oct. 11, 2000, now U.S. Pat. No. 6,268,065 which is a divisional application of U.S. application Ser. No. 09/033,607, filed Mar. 3, 1998 now U.S. Pat. No. 6,194,514).

BACKGROUND OF THE INVENTION

1. Field of the Invention

The present invention relates to aqueous dispersions based on poly(meth) acrylates, produced in a multi-state emulsion polymerization process, and to the use of such dispersions to prepare adhesives (bonding compositions) which are susceptible to hot-sealing.

2. Description of the Background

In the past, hot-sealing compositions have been devised for the packaging industry, which compositions full- meet the applicable technical criteria, but which contain substantial amounts of organic solvents. E.g., Eur. Pat. 129.178 describes a hot-sealable coating composition comprised of a film-forming dispersion of at least two different polymer types with different adhesion properties in an organic solvent system, Wherewith the dispersion contains polymers of the two types and in addition contains a polymer comprised of units corresponding to the two polymer types. Vinylidene chloride polymers have also been used widely in the past as hot-sealable compositions.

Coating compositions for sealing metal substrates are of particular practical and economic importance; in particular, compositions for providing seals between aluminum and plastics such as polystyrene, polypropylene, and polyvinyl chloride, or between aluminum and glass. (See Ullmanns Enzyklopaedie der techn. Chemie, 6th Ed., 1985 ff., Vol 16, pub. Verlag Chemie, pp. 101–103.)

Ger. Pat 4,209,651 (to BASF AG) describes an aqueous dispersion containing a copolymer A in the presence of which a polymerization is carried out to produce a copolymer B. Copolymer A is produced by bulk polymerization, and is not a core-and-shell product. The product materials are used in sealing PVC to paper board.

Jap. Pat. 08-231729 A (Derwent No. 96-461419/46). The products comprise core-and-shell polymers produced by emulsion polymerization followed by spray drying. The shell has larger amounts of carboxyl-group-containing monomers which improve the re-dispersibility of the product in water.

Rising awareness of environmental issues has created a trend away from solvent-containing formulations and toward aqueous dispersions such that when. e.g. a coating or adhesive is applied to a surface, organic compounds are not emitted into the environment. Also significant is the trend away from chlorine-containing products, and, perhaps to a lesser extent, aromatic compounds.

Technology has been able to adjust, to some extent, to these more stringent requirements. Thus, as disclosed in Ger. 29 06 118, polymers of vinylidene chloride, used as hot sealing adhesives, may be applied in the form of aqueous dispersions. In order to improve adhesion to un-primed plastic and metal sheets, special "anchoring agents" may be added to the composition. Suitable such additives are water-soluble polymers of functionally substituted acrylamides and/or methacrylamides, or copolymers of these monomers with acrylamide and/or methacrylamide, which (co) polymers are present as species dissolved in the aqueous phase of the dispersion.

Two methods of coating of aluminum foils and sheets are in widespread use:

In the case of relatively aggressive filler materials, first a primer coat of about 2 microns in thickness is applied to the aluminum foil. This primer is comprised of a viniyl-chloride-containing solution polymer. A finish coating comprised of a methacrylate resin of 4–8 micron thickness is then provided over the primer coat.

For cases of less aggressive filler materials, a single-coat system is used, employing a hot-sealable coating of thickness of about 5–10 microns comprising a mixture of the abovementioned polymers.

Still unsolved is the problem of providing a non-chlorinated, hot-sealing adhesive in the form of an aqueous dispersion with adequate adhesion. Ger. 27 27 914 (U.S. Pat. No. 4,291,090) and Ger. 28 55 147 disclose hot-sealing adhesives based on polyacrylate which can be applied as aqueous dispersions. In some cases, these adhesives are not comprised exclusively of esters of (meth)acrylic acid. That is, they may contain one or more comonomers, employed, e.g., for the purpose of modifying the melting temperature, hardness, or adhesion properties of the adhesive. Suitable comonomers include, inter alia. (meth)acrylamide, and aminoalkyl esters of acrylic acid and/or of methacrylic acid. The specific effects which these comonomers have on the properties of the polymers is not disclosed.

Ger. 39 30 743 (Can. Pat. App. 2.025,368.1) describes an aqueous polyacrylate dispersion, which is useful as a hot-sealing adhesive, based on at least 70 wt. % of a polyacrylate comprised of units of lower alkyl methacrylates and also containing polymerized (meth)acrylamide or aminoalkyl (meth)acrylate. Other publications relate to aqueous dispersions of copolymers of olefins and/or vinyl acetate, which copolymers contain units of chlorinated monomers and are produced in a single-stage process. The described dispersions exhibit poor adhesion to aluminum substrates.

Polymer dispersions, which are prepared from polymer particles having a core-and-shell structure, which are described in the literature, either contain chlorinated monomers or are not suitable for bonding plastics to aluminum.

Eur. Pat. 574,803 describes aqueous polymer dispersions of 5–80 wt. % of a copolymer (A), having a glass transition temperature of 50–150° C., and 95–20 wt. % of a copolymer (B), having a glass transition temperature of −50 to +50° C., the two copolymers in the composition havingwith a temperature difference of 20° C. There is no specific indication in this publication that the proposed products are suitable for bonding plastics to aluminum.

Further, no appropriate two-coat methods are described in the cited state of the art references.

A two-coat coating is proposed in Jap. Pat. App. 54-161, 684 (Chem.Abstr. 92:199427x). First, an aluminum foil is coated with the aqueous dispersion of a monomer and then with a mixture of an ethylene-vinyl acetate copolymer, colophony, and wax, to a thickness of 20 microns.

In connection with the object of formulating chlorine-free aqueous polymer dispersions for use as hot-sealing adhesives, another problem exists which is the problem of compatibility with the state of the art apparatus employed. This problem is particularly significant in the large-scale coating of aluminum foils and sheets. In particular, one should be able to use customary methods of applying polymers as thin films (see Polymer Handbook, 2nd Ed., pub. Hanser Verlag), and the films employed should not be sticky at ordinary temperatures.

A requirement imposed on means of hot sealing an adhesive to a suitable substrate is that good adhesion for bonding the two materials (e.g. aluminum and polystyrene) must be achieved in a short time and at temperatures which are not excessive and which are about, e.g., 180–220° C.

The proposed packaging methods are also intended for used with foodstuffs. In such applications, the monomers and the adjuvants must be selected such that the regulations governing food packaging (German Federal Health Office guidelines BGA 14, and the corresponding US FDA guidelines) are complied with.

In Ger. 39 30 743 an aqueous dispersion is proposed which has adequate adhesion to an aluminum foil substrate coated with a vinyl chloride copolymer as a primer. Efforts to modify such dispersions by incorporating units of adhesion-promoting monomers in order to provide a variant which can be applied to un-primed aluminum have not been successful. Thus the reference does not provide a solution to the problem of replacing chlorinated primers. Other efforts using similar approaches, using polymers with simple particle structures, have not been successful.

SUMMARY OF THE INVENTION

Accordingly, one object of the present invention is to provide an aqueous polymer dispersion of improved hot-sealing and adhesion characteristics to plastic and metal substrates.

Another object of the present invention is to provide aqueous poly(meth) acrylate dispersions PD, which are produced by emulsion polymerization and which have at least a two-stage particle structure, for use as hot-sealing adhesives.

Briefly, these objects and other objects of the present invention as hereinafter will become more readily apparent can be attained by aqueous poly(meth)acrylate dispersions, comprising:

a particulate poly(meth)acrylate comprising the following components:
(A) 50–90 wt. % of methacrylic acid alkyl esters;
(B) 5–30 wt. % of an acrylic acid alkyl ester having a glass transition temperature Tg in the range c. −20 to 50° C. and having formula I:

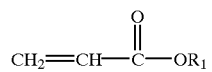
(Formula I)

wherein $R_1$ represents an alkyl, aryl, or alkaryl group having 2–10 C atoms;
(C) 2–10 wt. % of a functionalized monomer of formula II:

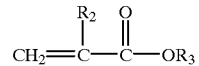
(Formula II)

wherein $R_2$ represents hydrogen or methyl; and $R_3$ represents a glycidyl group

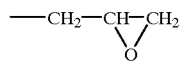

or an alkyl group which has 2–6 C atoms and is substituted with at least one hydroxyl group;
(D) 2–10 wt. % of at least one radically polymerizable carboxylic acid or a polycarboxylic acid or a partially esterified polycarboxylic acid: and
(E) 0–40 wt. % of other monomers which are copolymerizable with (A) to (D); wherewith, in the process of preparation, a first polymerization stage (Process Step 1) is conducted with monomers of groups (A) to (C) and optionally (E), and in a second polymerization stage (Process Step 2), monomers of groups (A), (B), (D), and optionally (E) are copolymerized; and wherewith the sum of the amounts of monomers (A) to (E) is 100 wt. %.

DETAILED DESCRIPTION OF THE PREFERRED EMBODIMENTS

The sum of the percentages of monomer units from groups (A) to (E) is 100 wt. %. The preferred monomer of formula I is n-butyl acrylate. Preferred monomers of formula II include glycidyl (meth)acrylate and hydroxyethyl (meth) acrylate.

Suitable monomers for group (E) monomers include styrene, ($C_1$ to $C_4$)-alkylstyrene compounds, cycloalkyl (meth)acrylates, and the like. Data on glass transition temperatures TG may be found in, e.g., Kirk and Othmer, 1978, "Encyclopedia of Chemical Technology", 3rd Ed., pub. J. Wiley, Vol. 1, pp. 387–389.

The ratio of the materials in the first polymerization stage to the materials in the second polymerization stage ranges from 30:70 to 70:30 parts by weight (pbw). A recommended rule for the proportioning of the polymerization stages is that the amounts should not differ by more than a factor of 2.5.

Additional preferred embodiments of the reaction include the following:
(i) The methacrylate content of the monomers polymerized in the first stage should be about 60±20 wt. %.
(ii) The content of monomers of formula I in the monomers polymerized in the first stage should be about 30±10 wt. %.

(iii) The content of monomers of formula II in the monomers polymerized in the first stage should be about 10±5 wt. %.

(iv) The remainder of the monomers to complete 100 wt. % of the monomers in the first stage is the monomer of group (E).

Still further preferences include:

(i) The content of methyl methacrylate and/or monomers of group (E) in the monomers polymerized in the second stage should be c. 20±10 wt. %.

(ii) The content of (meth)acrylic acid in the monomers polymerized in the second stage should be about 12±8 wt. %.

For each stage of polymerization, the sum of the percentages of all the monomers is 100 wt. %.

The molecular weights of the poly(meth)acrylates in the dispersion PD are generally in the range >20,000 g/mol. The polymer content of the dispersions is generally in the range 20–65 wt. %; and the particle sizes are generally in the range 60–250 nm, preferably 80–160 nm, particularly preferably 100–140 nm (determined by photon correlation spectroscopy).

The poly(meth)acrylate dispersion PD of the invention is produced by emulsion polymerization in the aqueous phase in the presence of anionic, cationic, or nonionic emulsifiers, which emulsifiers are per se known, and in the presence of at least one radical-forming initiator, in a two-stage reaction (see Rauch-Puntigam, H., and Voelker, Th. 1967, "Acryl- und Methacrylverbindungen", pub. Springer-Verlag, pp. 217–230).

It should be noted that certain advantageous properties, e.g. resistance to peeling, as specified in food packaging regulations (BGA 14 guidelines, and the corresponding US FDA guidelines), can be achieved with the use of additives.

The first stage may be conducted as a controlled-feed process: A suitable reaction vessel equipped with a stirrer and heater is initially charged with deionized water and emulsifier(s). Subsequently, after a certain temperature is reached, the initiator, preferably dissolved in water, is added. The initiator may be, e.g., an inorganic peroxide such as potassium peroxydisulfate (KPS) or ammonium peroxydisulfate (APS). It is recommended that the content of initiator in the mixture at this point be in the neighborhood of 0.8 wt. %, based on the weight of the monomers reacted in Process Step 1.

Suitable ionic emulsifiers, which are used in amounts of 0.01–2.0 wt. %, based on the total weight of monomers, include anionic emulsifiers Such as Aerosol OT75(R) of Cyaniamid BV and "Dowfax 2A1" of Dow Europa SA.

The addition of the above-described mixture for Process Step 1 is a controlled feed over a prescribed period of time, e.g. 2 hr, in the first stage. As an example, the feed mixture for Process Step 1 may comprise 20–60 wt. % of the total water to be used, plus the monomers of groups (A) to (C) and optionally (E).

Advantageously, the mixture is then mixed for an additional period of time, e.g. 1 hr, at elevated temperature, e.g. 80° C., following which it is allowed to cool, e.g. to 30° C. The monomers described above in connection with "Process Step 2" are then added dropwise over a relatively short period of time, e.g. 30 min, and the mixture is then allowed to stand for an appreciable period of time, e.g. 4 hr.

The resulting aqueous monomer/polymer mixture is then heated slightly, e.g. to 40° C., and additional radical initiator, preferably a redox-type initiator, e.g. comprised of peroxydisulfate. dithionite, and iron(II) sulfate, is added in water, and further polymerization is initiated.

After the maximum temperature is reached, advantageously the temperature is controlled, e.g. at 80° C., and the mixture is stirred for an additional period, e.g. 2 hr, to complete the polymerization.

Alternatively, the second stage can be carried out as another controlled-feed "semicontinuous" step, with addition of a monomer emulsion gradually over a period of, e.g., 2 hr.

The mixture is cooled to about 30° C., and advantageously a suitable preservative is added, e.g. Acticid SPX(R) of Thor Chemie GmbH, along with a small amount of ammonia (as 25% ammonia in water).

One may also add 0–5% of nonionic emulsifiers, e.g. ethoxylated alcohols, or methacrylate esters of methoxypolyethylene glycols, e.g. "Carbowax 550", or alkylphenols, and also an additional amount of an anionic emulsifier.

As a rule, the polymer dispersion (PD) may be used directly for coating. In certain cases limited amounts of thickeners or film-forming agents may be employed. The coating may be applied by spraying, brushing, pouring, dipping, blade-coating, or roll-coating. Generally the coating is applied in a thickness such that the dried coating has a thickness such that the dried coating layer is 2–10 microns thick.

Advantageously, the coated articles are dried in a drying oven or by continuously conveying the coated articles through a drying tunnel, possibly at reduced pressure and at temperatures in the range 100–200° C.

In general, the higher the drying temperature, the shorter the drying time. Drying times are, e.g., in the range 5 sec to 5 min. It is possible to apply the coating in multiple coats. Preferably, the substrate to which the polymer dispersion (PD) is applied has a non-porous and continuous ("closed") surface, e.g. the surface of a plastic film or sheet, or particularly of a metal foil or sheet, e.g. aluminum foil or iron.

As stated above, one advantage of using the present poly(meth)acrylate dispersions (PD) as hot-sealing adhesives is that they solve the important and urgent problem of formulating a hot-sealable composition based on an aqueous acrylate dispersion. e.g. the type of dispersion disclosed in Ger. 39 30 74, which composition adheres strongly to substrates, particularly metal foils or sheets, and in particular aluminum foils or sheets.

Accordingly, the principal embodiment of the present invention is hot-sealable coated substrates, particularly of metal or plastic, coated with the present poly(meth)acrylate dispersion(s) (PD) as a primer layer, with a second layer applied over the primer layer comprised of an aqueous poly(meth)acrylate dispersion comprised of:

at least 70 wt. % of at least one $C_1$–$C_4$-alkyl ester of (meth)acrylic acid, and an appreciable amount of (meth)acrylamide and/or aminoalkyl (meth)acrylate; wherewith the second layer is applied over the dried primer layer, and then dried.

For details beyond those provided in the example embodiments described below, reference is made to the disclosure of Ger. 39 30 743. A representative such dispersion and the means of its application are described hereinbelow (see Part II of the Example section).

In hot-sealing, the temperature in the coating must exceed the glass transition temperature of the poly(meth) acrylate. The temperature of the hot contact members which effect the sealing must exceed the required sealing temperature by an amount which increases as the contact time is decreased and as the heat conduction through the substrate layer is decreased. A thin metal foil has very good heat conduction, enabling the hot contact members to be at a temperature which is only slightly above the melting temperature of the poly(meth)acrylate. However, in practice the fastest possible sealing is desired, necessitating substantially higher temperatures of the hot contact members, e.g. 120–220° C. In the case of a plastic substrate, the hot contact member temperature may have to be limited because of the glass transition temperature of the plastic. To obtain a seal of high strength, the pressure exerted by the hot contact members should be at least 1 kp/cm$^2$, preferably 3–6 kp/cm$^2$.

The effective peeling resistance of hot-sealing samples from the Examples seas tested in the customary fashion (sealing seam strength according to DIN 51 221).

The objective was to demonstrate that, e.g., the use of the present poly(meth)acrylate dispersions as primers on aluminum foils or sheets, along with the use of the aqueous dispersions of Ger. 39 30 743, as an outer hot-sealable layer provides adhesive properties equivalent to those provided with primers based on solvent-containing and/or chlorinated polymers.

Having now generally described the invention, a further understanding can be obtained by reference to certain specific examples which are provided herein for purpose of illustration only and are not intended to be limiting unless otherwise specified.

The production and testing of hot-sealed samples is described hereinbelow, and a table of the strengths of the seals is be presented.

COMPARATIVE EXAMPLES

To produce the comparative samples a 10 wt. % solution of a commercial vinyl chloride/vinyl acetate/maleic acid copolymer ("Vinylite VMHC", supplied by Union Carbide) in ethyl acetate was applied with a spiral blade applicator to a 40 micron thick soft aluminum foil, in a thickness such that after drying 1 min at 180° C., a primer of thickness 2 micron was produced. The present poly(meth)acrylate dispersions (PD) were applied with a blade applicator, and, to form a film, were immediately placed in a circulating air drying cabinet preheated to 180° C. before the water had evaporated from the dispersion coating. The applicator was selected such that the layer of dried hot-sealable adhesive had thickness of 0.5–3.0 micron.

The poly(meth)acrylate dispersions of Ger. 39 30 743 can be applied by a similar technique, after drying of the poly(meth)acrylate dispersions (PD).

The coated aluminum foils were sealed to polystyrene films and PVC films, respectively, on edge regions 1 cm wide, using a laboratory-scale hot sealing apparatus (manufactured by Brugger). The temperature of the hot contact members was 180° C., the sealing pressure was 6 kp/cm$^2$, and the sealing time was 1 sec.

Seal strength was measured by the procedure described in DIN 51 221. The samples were first stored in a standard atmosphere (23° C., 50% relative humidity). Strips 15 mm wide were cut transversely to the seal seam, folded outward, and tested in a tensile testing machine, with one of the holding clamps gripping the free end of the aluminum foil and the other gripping the free end of the plastic film, wherewith the tensile force was exerted approximately transversely to the sealing seam on the test strip. The seal seam strength was taken to be the force required to advance the separation of the foil and film to the extent of 15 mm.

To test water resistance of the seal seam, the sample strips were stored 48 hr in water at room temperature, then tested for seal strength in the wet state by the above-described method. Examples 1–20 (Table 1):

Ia. General Method of Producing Poly(meth) acrylate Dispersions PD with Emulsion Polymerization Process variants:
(Iaa) Controlled feed ("semicontinuous") process.
(Iab) Controlled feed followed by batch.
(Iac) Controlled feed followed by controlled feed.

Into a round-bottom flask equipped with a stirrer, contact thermometer, and heater, were charged deionized water and an emulsifier (Aerosol OT75(R)), and heating was begun. After the temperature reached 90° C., ammonium peroxydisulfate (APS) dissolved in water was added as an initiator, and Process Step I was begun.

(Iaa) For variant Iaa, the feed was added gradually over 240 min, followed by stirring at 80° C. for an additional 2 hr, to allow completion of the polymerization.

(Iab) For variant Iab, the feed for Process Step 1 was added gradually over 120 min, followed by stirring at 80° C. for an additional 1 hr, and cooling at 30° C. Then the feed for Process Step 2 was added dropwise over 30 min, following which the mixture was allowed to stand 4 hr. The monomer/polymer mixture was then heated to 40° C. and a redox initiator was added. After the maximum temperature was reached, the temperature was maintained at 80° C. and stirring was continued for an additional 2 hr, to allow completion of the polymerization.

(Iac) For variant Iac, the feed for Process Step 1 was added gradually over 120 min, followed by stirring at 80° C. for an additional 40 min. Then the feed for Process Step 2 was added gradually over 2 hr, following which the mixture was stirred for an additional 2 hr to allow completion of the polymerization.

In all three variants (Iaa) to (Iac), a preservative in water was then added (for amounts, see Table 3).

The data for Examples 1–19 are presented in Tables 1 and 3. Table 1 gives the monomer compositions, amounts of emulsifier, and amounts of water, for Process Step 1 and Process Step 2. Table 3 gives the amounts of various additives.

Ib. Production of the Poly(meth)acrylate Dispersions by Emulsion Polymerization in a Process Comprising a Batch Process Followed by a Controlled Feed Process Into a round-bottom flask equipped with a stirrer, contact thermometer, and heater, were charged the materials for the batch preparation (Process Step 1). The monomer mixture was the heated to 40° C. and a redox-type initiator was added, to initiate the polymerization. After the maximum temperature was reached, the temperature was maintained at 80° C. and stirring was continued for an additional 40 min. Then the feed for the controlled feed process (Process Step 2) was added gradually over a period of 2 hr, following which the mixture was stirred for an additional 1 hr to allow completion of the polymerization. The preservative was then added at 30° C.

For example 20, Table 1 gives the monomer compositions, amounts of emulsifier, and amounts of water, for Process Step 1 and Process Step 2, and Table 3 gives the amounts of various additives.

II. Production of an Aqueous Polyacrylate Dispersion (according to Ger. 39 30 743, "Coating2 for use as a sealant"):

In a 1-liter round-bottom flask equipped with a stirrer, contact thermometer, and heater, 60 pbw of fully desalinated water and 0.05 pbw of sodium diisooctylsulfosuccinate were heated to 80° C. with stirring, and 2.4 pbw of a 10 wt. % solution of ammonium peroxydisulfate (APS) was added. Thereafter, the following were added dropwise over a period of 4 hr, also at 80° C.:

(i) An emulsion comprised of 240 pbw completely desalinated water, 4 pbw sodium diisooctyl sulfosuccinate, 1 pbw APS. 320 pbw butyl methacrylate, 72 pbw methyl methacrylate, and 8 pbw methacrylic acid amide, along with (ii) A regulator comprising 0.4 g dodecyl mercaptan. After another 2 hr at 80° C., the mixture was cooled to room temperature. A stable, coagulate-free dispersion was obtained. The solids content was about 50 wt. %. Mean particle diameter was 340 nm. The viscosity was 40 mPa-sec, as determined with a Brookfield viscosimeter.

III. Testing of the Hot Sealing Properties:

For examples 1–20 (with Examples 1–3 being comparative examples), a coating 1.5 micron thick comprised of the respective poly(meth)acrylate dispersion (PD) was applied to an untreated aluminum foil, followed by drying 1 min at 180° C. Then a coating 7 micron thick comprised of the dispersion of Sec. II was applied, again followed by drying 1 min at 180° C. Strips 15 mm wide comprised of the thus treated aluminum foils were sealed against a polystyrene film. Sealing duration was 1 sec, with the hot contact members being at 180° C. and exerting a pressure of 6 kp/cm$^2$.

The adhesive strengths of these bonded structures are given in Table 4. If the bond failed a hand separation test, the measurement was not performed. The first value of resistance to peeling given is the value for the dry bond; the second is the value after storing 48 hr in water.

Results

The results demonstrate that, by a rational selection of the monomers and the production process, aqueous polymer dispersions of the invention can be produced which yield primer layers on aluminum foil which primers provide adhesive properties equivalent to those provided with primers based on solvent-containing and/or chlorinated polymers.

IV. Testing of Adhesion of Primers to Various Metallic Substrates

A variety of metal plates ("BM") comprised of aluminum or iron were cleaned with ethyl acetate. The dispersion being tested was applied to the desired site by means of a film drawing apparatus, with gap heights of 20 micron, 80 micron, and 100 micron. Also, dispersions to which 4% butyldimethyl glycol acetate ("BDGA") had been added were applied, using gap heights of 100 micron and 200 micron. The adhesion was measured by a grid-cutting test (with an a added Tesa film-peeling test), evaluated visually.

Results

In all instances, the films adhered well.

TABLE 1

(parts 1 and 2 of 2):
    Dispersions (PD) prepared according to variant methods Iaa, Iab, Iac, and Ib:
    [For Table 1 parts 1 and 2, see 2 pages following the text.]
KEY to Table 1:
Columns:
    (a)    Process;
    Examples 1–3. (comparison examples). [Method variant] Iaa;
    Examples 4–17. [Method variant] Iab, first process step is controlled feed process, second process step is batch;
    Examples 18–19. [Method variant] Iab, first process step is controlled feed process, and second process step is controlled feed process.
    Examples 20. [Method variant] Ib [lit., "Iab"],
        first process step is batch, and second process step is controlled feed process.
Rows:
    (b)    First process step (controlled feed for Examples 1–19; batch for Example 20).
    (c)    VINYLITE VMHC = Vinyl Chloride/Vinyl Acetate/Maleic Acid Copolymer
(supplied by Union Carbide), dissolved in ethyl acetate.

| Process | Iaa Example 1 | Iaa Example 2 | Iaa Example 3 | Iab Example 4 | Iab Example 5 | Iab Example 6 | Iab Example 7 | Iab Example 8 | Iab Example 9 | Iab Example 10 |
|---|---|---|---|---|---|---|---|---|---|---|
| First Step | Semicontinuous | Semicontinuous | Semicontinuous | Semicontinuous | Semicontinuous | Semicontinuous | Semicontinuous | Semicontinuous | Semicontinuous | Semicontinuous |

TABLE 1-continued

| | | | | | | | | | | |
|---|---|---|---|---|---|---|---|---|---|---|
| Water | 533.7 | 531 | 531 | 509.7 | 509.7 | 510.6 | 509.7 | 509.7 | 509.7 | 509.7 |
| Aerosol OT75(R) | 8.5 | 8.55 | 8.55 | 8.55 | 8.55 | 8.55 | 8.55 | 8.55 | 8.55 | 8.55 |
| Methyl Methacrylate | 39.5 | 360 | | 270 | 270 | 270 | 292.5 | 281.25 | 292.5 | 270 |
| Butyl Acrylate | 35 | 135 | 135 | 135 | 135 | 135 | 135 | 135 | 135 | 135 |
| Glycidyl Methacrylate | | | | 45 | | | | | | |
| Hydroxyethyl Acrylate | | 45 | 45 | | 45 | 45 | 22.5 | 33.75 | 22.5 | 45 |
| Butyl Methacrylate | 697.5 | | | | | | | | | |
| Methacrylamide | 18 | | | | | | | | | |
| Methacrylic Acid | 22.5 | | | | | | | | | |
| Acrylic Acid | 22.5 | 45 | 45 | | | | | | | |
| Butyl Methacrylate | | 315 | 315 | | | | | | | |
| First Step | Semicontinuous | Semicontinuous | Semicontinuous | Semicontinuous | Semicontinuous | Semicontinuous | Semicontinuous | Semicontinuous | Semicontinuous | Semicontinuous |
| Styrene | | | | 360 | | | | | | |
| Dodecyl Mercaptan | | | | | | 0.45 | | | | |
| Second Step | | | | Example | Example | Example | Example | Example | Example | Example |
| Butyl Methacrylate | | | | 315 | 315 | 315 | 315 | 315 | 315 | 315 |
| Methyl Methacrylate | | | | 90 | 90 | | 112.5 | 101.25 | 90 | 112.5 |
| Acrylic Acid | | | | 45 | 45 | 45 | 22.5 | 33.75 | 45 | 22.5 |
| Styrene | | | | | | 90 | | | | |
| Polycarboxylic Acid* | | | | | | | | | | |
| Aerosol OT75(R) | | | | | | | | | | |
| Water | | | | | | | | | | |
| Ammonium Peroxydisulfate | | | | | | | | | | |

| | Iab Example 11 | Iab Example 12 | Iab Example 13 | Iab Example 14 | Iab Example 15 | Iab Example 16 | Iab Example 17 | Iab Example 18 | Iab Example 19 | Ib Example 20 |
|---|---|---|---|---|---|---|---|---|---|---|
| First Step | Semicontinuous | Semicontinuous | Semicontinuous | Semicontinuous | Semicontinuous | Semicontinuous | Semicontinuous | Semicontinuous | Semicontinuous | Semicontinuous |
| Water | 482.2 | 482.2 | 482.2 | 482.2 | 814.3 | 482.2 | 370.4 | 266.9 | 361.5 | 629.2 |
| Aerosol | 8.55 | 8.55 | 8.55 | 8.55 | 3.43 | 8.55 | 10.3 | 4.28 | 3 | 0.9 |
| Methyl Methacrylate | 270 | 270 | 270 | 270 | 198 | 270 | 324 | 270 | 270 | 270 |
| Butyl Acrylate | 135 | 135 | 135 | 135 | 54 | 135 | 162 | 135 | 135 | 135 |
| Glycidyl Methacrylate | | | | | | | | | | |
| Hydroxyethyl Acrylate | 45 | 45 | 45 | 45 | 18 | 45 | 54 | 45 | 45 | 45 |
| Butyl Methacrylate | | | | | | | | | | |
| Methacrylamide | | | | | | | | | | |
| Methacrylic Acid | | | | | | | | | | |
| Acrylic Acid | | | | | | | | | | |
| Butyl Methacrylate | | | | | | | | | | |
| Styrene | | | | | | | | | | |
| First Step | Semicontinuous | Semicontinuous | Semicontinuous | Semicontinuous | Semicontinuous | Semicontinuous | Semicontinuous | Semicontinuous | Semicontinuous | Semicontinuous |
| Dodecyl Mercaptan | | | | | | | | | | |
| Second Step | Example | Example | Example | Example | Example | Example | Example | Semicontinuous | Semicontinuous | Semicontinuous |
| Butyl Methacrylate | 315 | 315 | 315 | 315 | 126 | 315 | 378 | 315 | 315 | 315 |
| Methyl Methacrylate | 90 | 90 | | | 36 | 90 | 108 | 90 | | |
| Acrylic Acid | 45 | 45 | 45 | 45 | 18 | | 54 | 45 | 45 | 45 |
| Styrene | | | 90 | 90 | | | | | 90 | 90 |
| Polycarboxylic | | | | | | 112.5 | | | | |

TABLE 1-continued

| | | | |
|---|---|---|---|
| Acid* | | | |
| Aerosol | 4.28 | 3 | 7.88 |
| Water | 266.9 | 261.5 | 210.4 |
| Ammonium Peroxydisulfate | 0.9 | 0.9 | 0.9 |

*Polycarboxylic Acid - Rohagit SL 140

TABLE 2

Amounts of Additives

Second Process Step (but first process step in Example 20)

| | Initial Charge to Reactor | | | | | | Sodium | After Polymerization | |
|---|---|---|---|---|---|---|---|---|---|
| Example | Water | Aerosol OT75(R) | Ammonium Peroxydisulfate[a] | Ammonium Peroxydisulfate[a] | $Fe_2(SO_4)_3$[b] | $Na_2S_2O_5$[c] | Hydroxymethyl Sulfinate[d] | Acticid SPX in 10 g water | $NH_3$[e] |
| 1 | 340 | 0.255 | 2.7 | | | | | 1.8 | 0.34 |
| 2 | 340 | 0.225 | 2.7 | | | | | 1.8 | 0.34 |
| 3 | 340 | 0.225 | 2.7 | | | | | 1.8 | 0.34 |
| 4 | 340 | 0.225 | 2.7 | 0.72 | 0.0009 | 0.36 | | 1.8 | 0.34 |
| 5 | 340 | 0.225 | 2.7 | 0.72 | 0.0009 | 0.36 | | 1.8 | 0.34 |
| 6 | 340 | 0.225 | 2.7 | 0.72 | 0.0009 | 0.36 | | 1.8 | 0.34 |
| 7 | 340 | 0.225 | 2.7 | 0.72 | 0.0O09 | 0.36 | | 1.8 | 0.34 |
| 8 | 340 | 0.225 | 2.7 | 0.72 | 0.0O09 | 0.36 | | 1.8 | 0.34 |
| 9 | 340 | 0.225 | 2.7 | 0.72 | 0.0009 | 0.36 | | 1.8 | 0.34 |
| 10 | 340 | 0.225 | 2.7 | 0.72 | 0.0009 | 0.36 | | 1.8 | 0.34 |
| 11 | 340 | 0.045 | 2.7 | 0.72 | 0.009 | | 0.504 | 1.8 | 0.34 |
| 12 | 340 | 1.8 | 2.7 | 0.72 | 0.009 | | 0.504 | 1.8 | 0.34 |
| 13 | 340 | 0.045 | 2.7 | 0.72 | 0.009 | | 0.504 | 1.8 | 0.34 |
| 14 | 340 | 1.8 | 2.7 | 0.72 | 0.009 | | 0.504 | 1.8 | 0.34 |
| 15 | 556 | 0.091 | 1.08 | 0.288 | 0.0043 | | 0.202 | 0.72 | 0.135 |
| 16 | 340 | 0.225 | 2.7 | 0.72 | 0.009 | | 0.504 | 1.8 | 0.34 |
| 17 | 268 | 0.27 | 3.24 | 0.864 | 0.011 | | 0.605 | 2.16 | 0.41 |
| 18 | 340 | 0.225 | 2.7 | | | | | 1.8 | 0.34 |
| 19 | 340 | 0.3 | 0.9 | | | | | 1.8 | 0.34 |
| 20 | | | | 0.72 | 0.009 | | 0.504 | 1.8 | 0.34 |

[a]Ammonium Peroxydisulfate dissolved in 20 g water
[b]$Fe_2(SO_4)_3$ dissolved in 10 g water
[c]$Na_2S_2O_5$ dissolved in 20 g water
[d]Sodium Hydroxymethyl Sulfinate dissolved in 20 g water
[e]20% Ammonia in 5 g water

TABLE 4

Measurements of resistance to peeling:

Peeling Strength, N, for 15 mm strip width:

| | Seal between aluminum and polystyrene ("PS") | | Seal between aluminum and PVC | |
|---|---|---|---|---|
| Example Number | Normal pressed | After 48 hr in water | Normal Pressed | After 48 hr in water |
| 1 | Value too low | | | |
| 2 | 4.8 | 1.7 | 2.1 | 1.1 |
| 3 | 5.7 | 3.7 | 3.1 | 1.7 |
| 4 | 6.9 | 8.0 | 6.7 | 5.8 |
| 5 | 8.1 | 4.3 | 5.1 | 2.5 |
| 6 | 7.0 | 6.0 | 3.8 | 2.4 |
| 7 | Value too low | | | |
| 8 | Value too low | | | |
| 9 | Value too low | | | |
| 10 | Value too low | | | |
| 11 | 6.9 | 4.7 | 3.4 | 2.9 |
| 12 | 5.0 | 6.2 | 3.3 | 3.3 |
| 13 | 4.7 | 2.3 | 2.3 | 2.3 |
| 14 | 7.6 | 7.4 | 4.8 | 3.7 |
| 15 | 4.2 | 6.8 | 1.9 | 2.4 |
| 16 | 4.2 | 4.9 | 1.9 | 2.1 |
| 17 | 5.9 | 1.9 | 3.9 | 2.9 |
| 18 | 2.0 | 0.6 | 1.3 | 0.7 |
| 19 | 8.1 | 8.0 | 6.9 | 5.6 |
| 20 | 3.8 | 4.3 | 2.4 | 2.6 |

TABLE 5

Results of adhesion tests of Example 9 sample, using grid-cutting test.
(Data are the number of fields loosened in the test.)

| | Film according to Example 19 | | | | | | Film according to Example 19 + 4% butyldiethylene glycol acetate ("BDCA"), applied to solid metal plates ("BM") | | | |
|---|---|---|---|---|---|---|---|---|---|---|
| | Drying 180° C., 1 minute; application with film-drawing apparatus; column headings are gap height (micron) | | | Drying 180° C., 2 minutes; application with film-drawing apparatus; column headings are gap height (micron) | | | Drying 180° C., 1 minute; application with film-drawing apparatus; column headings are gap height (micron) | | Drying 180° C., 2 minutes; application with film-drawing apparatus; column headings are gap height (micron) | |
| | 20 μm | 60 μm | 100 μm | 20 μm | 60 μm | 100 μm | 100 μm | 200 μm | 100 μm | 200 μm |
| Actual coating thickness (micron) (measured on the Fe plate) | 12–19 | 14–28 | 15–27 | 14–18 | 13–17 | 12–33 | 15–28 | 33–46 | 20–30 | –40 |
| Iron plate | 0/0 | 0/0 | 0/0 | 0/0 | 0/0 | 0/0 | 0/0 | 0/0 | 0/0 | 0/0 |
| Aluminum plate | 2/4)*** | 0/0 | 0/0 | 0/0 | 0/0 | 0/0 | 0/0 | 0/0 | 0/0 | 0/0 |

***Drying was not optimal for this [failing] test.

German priority application 197 08 412.5 filed Mar. 3. 1997 is hereby incorporated by reference into the present application.

Obviously, numerous modifications and variations of the present invention are possible in light of the above teachings. It is therefore to be understood that within the scope of the appended claims, the invention may be practiced otherwise than as specifically described herein.

What is claimed is:

1. A method of priming a metal surface, comprising:

applying an aqueous polymer dispersion on a surface of a metal;

wherein said aqueous dispersion comprises a particulate poly(meth)acrylate comprising the following monomeric components:

(A) 50–90 wt. % of a methacrylic acid alkyl ester;
(B) 5–30 wt. % of an acrylic acid alkyl ester having a glass transition temperature Tg in the range of –20 to 50° C. and having formula I:

(Formula I)

wherein $R_1$ represents an alkyl, aryl, or alkaryl group having 2–10 C atoms;

(C) 2–10 wt. % of a functionalized monomer of formula II:

(Formula II)

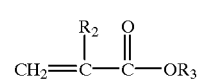

wherein $R_2$ represents hydrogen or methyl; and $R_3$ represents a glycidyl group

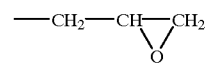

or an alkyl group which has 2–6 C atoms and is substituted with at least one hydroxyl group;

(D) 2–10 wt. % of at least one radically polymerizable carboxylic acid or a polycarboxylic acid or a partially esterified polycarboxylic acid; and (E) 0–40 wt. % of other monomers which are copolymerizable with (A) to (D);

wherein, in the process of preparation, in a first polymerization stage, monomers (A) to
(C) and optionally (E) are copolymerized;

wherein in a second polymerization stage, monomers (A), (B), (D) and optionally (E) are copolymerized; and wherein the sum of the amounts of monomers (A) to (E) is 100 wt. % in each polymerization stage.

2. The method according to claim 1, wherein said metal surface is a surface of an aluminum sheet, an aluminum foil, an iron sheet or an iron foil.

3. The method according to claim 1, wherein the monomer of formula I is n-butyl acrylate.

4. The method according to claim 1, wherein the monomer of formula II is glycidyl (meth)acrylate or hydroxy (meth)acrylate.

5. The method according to claim 1, wherein said monomer (E) is styrene, $C_1$–$C_4$ alkylstyrene or cycloalkyl (meth)acrylate.

6. The method according to claim 1, wherein said applying is a method selected from the group consisting of spraying, brushing, pouring, dipping, blade-coating and roll-coating.

7. The method according to claim 1, further comprising:

drying of said metal surface after said applying of said aqueous polymer dispersion, thereby obtaining a dried coating.

8. The method according to claim 7, wherein said dried coating has a thickness of from 2 to 10 microns.

9. The method according to claim 7, wherein said drying occurs at a temperature of from 100 to 200° C.

10. The method according to claim 7, wherein a drying time is from 5 seconds to 5 minutes.

11. The method according to claim 1, wherein a methacrylate content of the monomers polymerized in said first polymerization stage is about 60±20 wt % based on a total weight of monomers (A) to (C) and (E).

12. The method according to claim 1, wherein a content of the monomer of formula (I) polymerized in said first polymerization stage is about 30±10 wt % based on a total weight of monomers (A) to (C) and (E).

13. The method according to claim 1, wherein a content of the monomer of formula (II) polymerized in said first polymerization stage is about 10±15 wt % based on a total weight of monomers (A) to (C) and (E).

* * * * *